United States Patent [19]

Cadek et al.

[11] Patent Number: 5,534,139
[45] Date of Patent: Jul. 9, 1996

[54] APPARATUS FOR CONTROLLING SOLIDS-LIQUID SEPARATION

[75] Inventors: Walter Cadek; Johannes Kappel, both of Graz; Rudolf Neuhold, Gratwein, all of Austria

[73] Assignee: Andritz-Patentverwaltungs-Gesellschaft m.b.H., Graz, Austria

[21] Appl. No.: 338,756

[22] Filed: Nov. 10, 1994

[30] Foreign Application Priority Data

Nov. 12, 1993 [AT] Austria .................................. 2298/93

[51] Int. Cl.$^6$ .................................................. C02F 11/14
[52] U.S. Cl. .......................... 210/96.1; 162/252; 210/101; 210/112; 210/143; 210/206; 210/400
[58] Field of Search ............................. 162/61, 198, 252, 162/258; 210/709, 739, 745, 96.1, 101, 103, 112, 106, 143, 205, 206, 400, 401

[56] References Cited

U.S. PATENT DOCUMENTS

| | | | |
|---|---|---|---|
| 4,341,628 | 7/1982 | Fujinami et al. | 210/103 |
| 4,500,968 | 2/1985 | Bialkowski | 162/252 |
| 4,612,123 | 9/1986 | Eustacchio et al. | 210/709 |
| 4,707,272 | 11/1987 | Kistler | 210/709 |
| 4,867,886 | 9/1989 | Botkins | 210/203 |
| 4,990,261 | 2/1991 | Ho | 210/709 |

FOREIGN PATENT DOCUMENTS 0316997  5/1989  European Pat. Off. .

*Primary Examiner*—Peter A. Hruskoci
*Attorney, Agent, or Firm*—Roylance, Abrams, Berdo & Goodman

[57] ABSTRACT

A process and apparatus for controlling and/or regulating a solids-liquid separation process, such as in a dewatering or drying device includes at least two photodetectors, each associated with a light source, a detector to detect light of the associated light source reflected from the surface of the solids-liquid mass, a controller generating an output signal as a function of the detected light and converting and processing the output signals of the photodetectors into correcting variables for controlling and/or regulating at least one process parameter of the separation process. At least one of the photodetectors is associated with at least one second photodetector for detecting light reflected into the photodetector at an angle, preferably an angle of 30° to the main direction of reflection. The output signals of the photodetectors are advantageously processed into correcting variables for the step-wise adjustment of the at least one process parameter to optimize the separation process.

16 Claims, 4 Drawing Sheets

APPARATUS FOR CONTROLLING SOLIDS-LIQUID SEPARATION

FIELD OF THE INVENTION

The invention relates to a process for controlling and/or regulating a solids-liquid separation process, such as in a dewatering or drying device, wherein at least two photodetectors each associated with a light source detect light of the associated light source reflected from the surface of the solids-liquid mass, generate an output signal as a function of the light intake and process the output signals of the photodetectors into correcting variables for controlling and/or regulating at least one process parameter of the liquid separation process. The invention furthermore relates to an apparatus for carrying out the process.

BACKGROUND OF THE INVENTION

One example of a solids-liquid separating process is a dewatering process for municipal sludges. The dewatering of low consistency sludge is often carried out using a dewatering machine such as, for example, a screening table or filter belt. Prior to introducing the sludge to the head box of the dewatering machine, the sludge is admixed with a polymeric flocculent. The flocculent significantly improves the dewatering of the dewatering machine.

The dosage or amount of the flocculent admixed with the sludge is an important parameter for technological reasons, since the highest dry matter content of the sludge is only attainable with correct dosage. In addition, it is desirable to avoid using excess amounts of the flocculent for economic considerations since the flocculent usually is very expensive. Both over-flocculating as well as under-flocculating reduce the efficiency of the solids-liquid separation process. Moreover, for economic reasons, it is necessary to optimize dosing in order to avoid unnecessary over-flocculation.

When manually adjusting the amount of flocculent added to the sludge as is frequently practiced, high demands are made on the operating personnel both with regard to estimating the correct flocculation state as well as with regard to concentration. This is aggravated by the fact that the effect of adjusting the amount of flocculent does not become apparent for several minutes after addition, because the flocculent is placed upstream of the head box sufficiently far to provide adequate time for flocculation of the sludge prior to its entering the screen. Thus, there is typically a long lag time between changes in the addition of the flocculent and the affect the change has on the dewatering.

One example of a known automatic process for controlling the process conditions in a dewatering process is disclosed in EPO 316,997 B1. The disclosed process detects light reflected form a moist surface of the material being filtered by photodetectors, compares the value with a desired known value and in accordance therewith, regulates the amount of flocculent added to the material. This process has the disadvantage that for each new sludge composition, a new desired known value must be prescribed. In addition, where the input conditions of the dewatering process fluctuate greatly, such as in the sludge composition, the plant will function inadequately and inefficiently.

The above-noted methods and apparatus for controlling and adjusting the operating parameters of liquid separation apparatus do not continuously operate the apparatus at peak or optimum performance. Accordingly, there is a continuing need in the industry for improved methods and apparatus for optimizing the performance of a liquid separation device.

SUMMARY OF THE INVENTION

Accordingly, a primary object of the invention is to provide a process and apparatus which regardless of the input conditions, will always set up and regulate an optimum end value, such as the dry matter content in a liquid separation device.

A further object of the invention is to provide a method and apparatus for determining or measuring the extent of liquid separation at different points along the liquid separation path of a liquid separation apparatus and using that measurement to control various operating parameters of the liquid separation.

Another object of the invention is to provide a method and apparatus for separating liquid from solid-liquid mixtures by automatically controlling the speed of the liquid separation device and/or the amount of flocculent or other additive introduced to the mixture upstream of the liquid separation device.

A further object of the invention is to continuously monitor the solid content of the material at various points along the flow path and adjust the process parameters to obtain the highest possible dryness differential between the feed end and discharge end of the liquid separation device.

These aspects of the invention are attained by providing a first photodetector associated with at least one second photodetector for detecting light reflected at an angle from the surface of the material being filtered preferably an angle of 30° to the main direction of reflection, the output signals of the photodetectors being advantageously processed into correcting variables for the step-wise adjustment of at least one process parameter to optimize the liquid separation. By the combination of signals from detected light reflected in a main direction of reflection and signals from detected light at a second angle to the main direction of reflection, a control signal is generated corresponding to the true dry matter content of the solid-liquid mixture even when the input conditions such as the sludge composition fluctuate greatly.

In another embodiment of the invention, at least one of the photodetectors is positioned for detecting light reflected from the surface of the solid-liquid mixture at least substantially in a direction equal and opposite to the direction of irradiation from the light source.

An advantageous embodiment of the process calculates the quotient or ratio of the output signal of the first photodetector and the output signal of the at least one associated second photodetector to calculate a correcting variable. Based on the quotient calculation, the dry matter content or the dry matter content differential may be determined in a particularly favorable manner and substantially independently from the frequent fluctuating input conditions.

These and other aspects of the invention are basically attained by a method of separating liquid from a solid-liquid mixture comprising: continuously moving a bed of the solid-liquid mixture through a liquid separating zone of a liquid separating device, the mixture having an upper surface, projecting light at a first angle with respect to the surface of the mixture from a light source onto a first illumination area on the upper surface of the mixture within the liquid separating zone, detecting light reflected from the first illumination area at a second angle with respect to the upper surface by a first photodetector, detecting light reflected from the first illumination area at a third angle with respect to the upper surface by a second photodetector, generating output signals from the first and second photodetectors corresponding to the amount of detected light, transmitting the output signals to a main control means and generating a control signal in response to the output signals, and transmitting the control signal to a separation rate control device of the liquid separating device and adjusting the rate of separation of liquid from the mixture.

Other aspects of the invention are attained by an apparatus for separating liquid from a solid-liquid mixture comprising: a conveyor for conveying a solid-liquid mixture through a liquid separation zone of a liquid separating device; at least two photodetector assemblies positioned above the conveyor and in the separation zone; each of the photodetector assemblies having a light source for projecting light onto an upper surface of the solid-liquid mixture at a first angle with respect to the upper surface, and a first photodetector for detecting the light reflected from the upper surface at a second angle with respect to the upper surface, the first photodetector having means for producing a first output signal; at least one of the photodetector assemblies having a second photodetector for detecting light reflected from the upper surface at a third angle with respect to the upper surface, the second photodetector having means for producing a second output signal; control means connected to the photodetector assemblies for receiving the output signals and producing a control signal in response to the output signals and transmitting the control signal to a separation rate control device for controlling the liquid separation of the mixture.

Other objects, advantages and salient features of the present invention will become apparent from the following detailed description and drawings which disclose preferred embodiments of the present invention.

BRIEF DESCRIPTION OF THE DRAWINGS

The following is a brief description of the drawings which form a part of this original disclosure in which:

FIG. 5b is a top view of the separation device of FIG. 5a; and

DETAILED DESCRIPTION OF THE INVENTION

Figure 1:
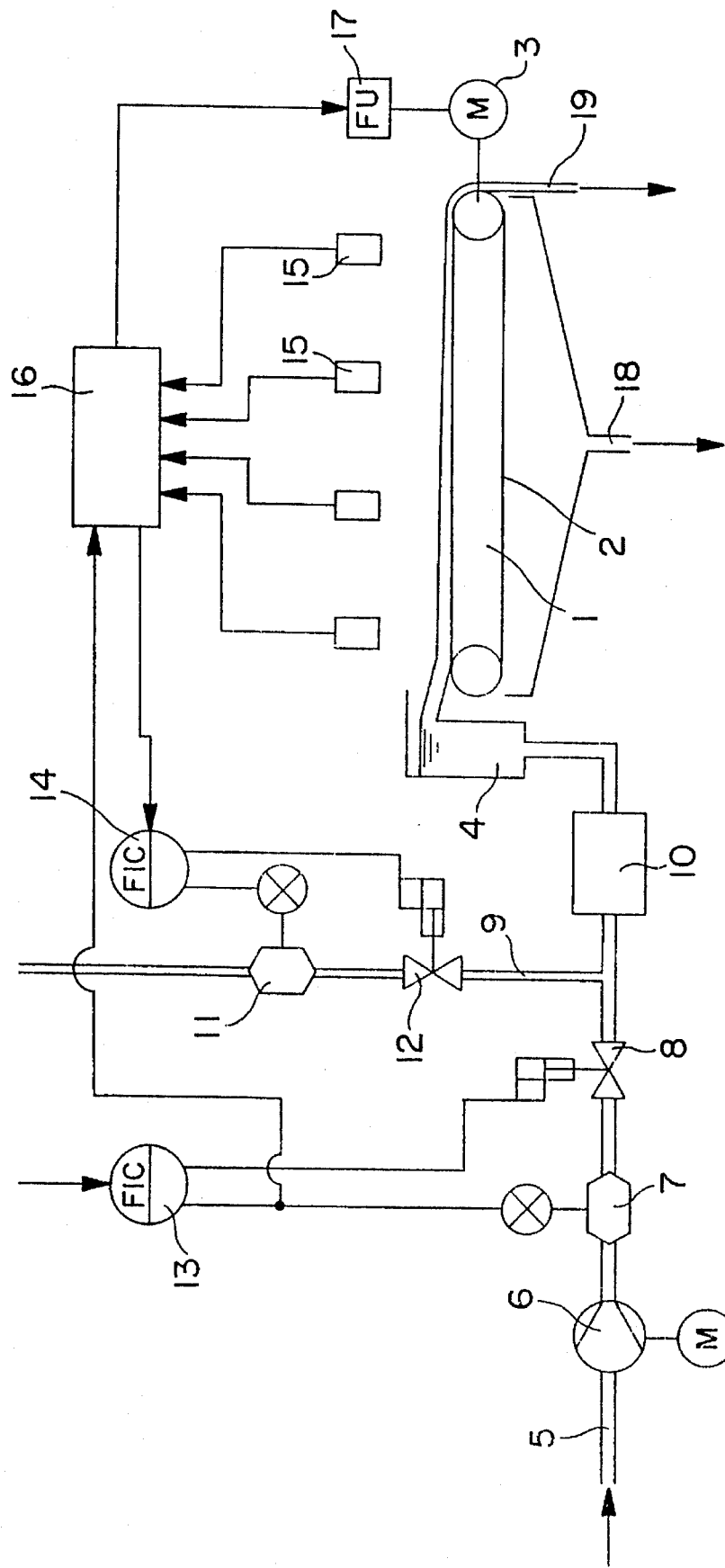
FIG. 1 is a schematic view of the present invention showing the liquid separation device and control system.

The disadvantages and limitations of the previous liquid separation devices and control processes are obviated by the present invention. Accordingly, the present invention is directed to a method and apparatus for the controlled liquid separation from a solid-liquid mixture by monitoring the dryness of the mixture at various points in the liquid separation zone and adjusting one or more control parameters based on measured dryness.

As shown in FIGS. 1–6, the apparatus of the invention in one preferred embodiment includes a liquid separation device, such as a dewatering filter belt 1, receiving a solid-liquid mixture from a head box 4. The dewatering filter belt 1 is operated by a drive motor 3 and speed controller 17. The mixture to be filtered is fed to the head box 4 by conduit 5. A flocculent is introduced into the conduit 5 through line 9 which then passes through a mixer 10 to mix the flocculent with the mixture for sufficient time to allow the floc to form before advancing to the filter belt 1. In alternative embodiments, the liquid separation device can be a gravity table type, suction type or continuous pressure filter.

As shown in FIG. 1, positioned above the filter belt 1 is one or more photodetector assemblies 15 for measuring reflected light from the surface of the mixture being filtered as discussed hereinafter in greater detail. The photodetector assemblies 15 detect reflected light from the mixture as an indication of the extent of dryness of the mixture at various points along dewatering path and produce a continuous output signal indicating the dryness which is transmitted to a main control 16. Control 16 is typically a standard microprocessor which receives the output signal and processes the signal to produce a continuous control signal. The control signal is transmitted to the speed controller 17 to control the speed of the filter belt 1 based on the extent of dryness of the mixture being filtered. In further embodiments, the control signal is transmitted to a flow controller 14 to control the amount of flocculent added to the mixture stream 5 or to a feed control 13 to adjust the amount of material fed to the liquid separation device.

In preferred embodiments of the invention, the signals are produced from the series of photodetectors positioned along the solids-liquid separation path. Each signal is transmitted to the control unit 16. Such multiple recording of signals permits a particularly effective monitoring of the progress of the solids-liquid separation along the separation path and the adjustment or regulating of the separation process in accordance with the particular requirements.

An advantageous embodiment of the process according to the invention calculates the difference between the dry matter content at the beginning and at the end of the solids-liquid separation zone or pathway to optimize the desired liquid separation result. Crucial for the dewatering or drying capacity is the removal of the liquid, and this is best determined by determining and monitoring difference between the dry matter content at the beginning and at the end of the separating path. In preferred embodiments, the control 16 adjusts the operating parameters to obtain a maximum difference between the dryness at the beginning and the end of the separation zone.

In the embodiments of FIG. 1, four photodetector assemblies 15 are spaced apart along the length of the liquid separation zone. A first photodetector is positioned upstream at the charging end of the filtration device and a second photodetector is positioned at the downstream discharge end. In this manner, the solid content can be determined at various points along the liquid separation zone to determine the progress of liquid separation. A measurement of the solid content at the upstream end and the downstream end can be compared to determine the extent of liquid separation. The control device searches for the highest dryness differential between the feed end and discharge end of the separation device.

A further advantageous feature of the invention uses the position of the turning point of the dry mater content pattern to attain the target solids content of the material being discharged from the dewatering device. Monitoring the dry matter content pattern and the water line yields particularly good indications concerning the efficiency of dewatering or drying. It is desirable to have the liquid separation proceed rapidly such that the turning point of the dry matter content is moved as far as possible towards the start of the separation zone.

In order to take into account the dependency of the target result and optimum performance of the system, it is advantageous to modify a plurality of process parameters. It is particularly desirable to adjust the operating parameters in a step-wise fashion.

A further feature of the inventive concept is to use the process parameter to modify the amount of flocculent added. In dewatering processes, small changes in the amount of flocculent added affects the dewatering process. It is generally desirable to avoid over and under dosing of the flocculent.

A further favorable embodiment of the invention modifies the speed of the screen of the liquid separation device. The residence period of the material to be dewatering or dried, e.g., sludge or paper in the separating zone is determined by the machine's speed which accordingly substantially affects the resulting liquid separation.

A further aspect of the invention is to optimize the energy input in the form of steam, hot gas, in particular air, and/or electrical energy. In the case of drying processes which comprise a contact and a convection drying component, optimizing the ratio as a function of the extent of drying is necessary to optimize energy costs.

A particularly advantageous feature of the invention is that once the optimum value is obtained, the extent of the liquid separation changes only within predetermined acceptable limits. In order to avoid continuous fluctuation about the optimum value as a result of fluctuations within the entire separation process, it is advantageous to terminate the optimizing procedure once the desired liquid separation improvements are less than a predetermined minimum value.

An advantageous further development of the inventive concept is characterized in that after attaining the optimum and after the conclusion of a waiting period, once again at least one process parameter is changed. Because the input conditions change frequently, it is advantageous if after a certain waiting period, it is once again desirable to optimize the individual process parameters.

The invention also relates to a system for controlling and/or regulating a solids-liquid separation process, for example, dewatering or drying, including at least two photodetectors for detecting light reflected from the surface of the solids-liquid mass and generating an output signal depending on the light detection. Each photodetector comprises a light source associated with the photodetectors and control means for monitoring and correlating the output signals of the photodetectors and for regulating at least one process parameter.

In preferred embodiments of the invention at least one of the first photodetectors is associated with at least one second photodetector for monitoring light reflected at an angle, preferably an angle of 30°, to the reflection direction onto the first photodetector. In further embodiments, at least one of the photodetectors is positioned for detecting light reflected essentially in a direction opposite to the direction of irradiation from a light source. Generally, the first photodetectors and associated second photodetectors are each accommodated in a sensor unit with the light source. The light source can be visible light, infrared or other light as known in the art. The photodetectors are selected for the particular light source.

A preferred embodiment of the liquid separation system is a dewatering process utilizing a screening table or a screening zone of a screening belt press, a screening belt, a sludge feed device, a flocculent feed device and a mixing means for sludge and flocculent. Alternatively, the solids-liquid separation process is a drying process. It is particularly advantageous for the means for monitoring and correlating the output signals of the photodetectors to be connected to a means for regulating the amount of flocculent added to the mixture stream.

A further development of the system comprises the means for monitoring and correlating the output signals of the photodetectors being connected to a speed regulating means for the driving means of the screen table or screening belt.

The invention will now be further explained with reference to an application for a dewatering process.

In one embodiment, the dewatering process controls the addition of a flocculent to the solids-liquid mixture being dewatered. Various methods exist for regulating the amount of flocculent. Prior methods are known in which the filtrate load is measured or even which determine the ion concentration in the filtrate. All these methods, however, suffer from the disadvantage that direct contact with the sludge or filtrate is necessary and that an inconvenient need exists for care to keep the measuring means clean. Rotting sludge residues as a result of prolonged stoppages may have a strongly adverse affect on regulating or may even cause substantial damage. The system according to the invention for controlling the amount of flocculent added to the mixture stream to be dewatered is substantially maintenance free. The only maintenance activity is calibrating the sensors, which is substantially automated, permitting this to be performed without difficulty during the operational pauses which normally arise and so that manual operations during normal operation are rendered redundant.

The system according to the invention measures the light reflected from the surface of the sludge without physical contact by the sensors. Advantageously, the invention uses an infrared light source and infrared detectors. The dewatering process at the dewatering screen can be monitored by the different reflectivities of "wet" and "dry" sludge. Accordingly, the flocculent addition and/or the screening velocity can be optimized based on the continuous monitoring.

The signal "dryness difference" corresponds to the difference between the optical properties of the sludge as derived from the head box (wet state) and the properties of the sludge towards the end of the screen or the screening table (dry condition). By approximation, this signal corresponds to the difference in the dry matter contents (dryness difference) between the mixture proximate the head box and the mixture toward the discharge end of the dewatering device. Essentially, the dryness differences (see FIGS. 2, 2a) and the water line (see FIGS. 3, 3a) are monitored for the optimization of the dewatering process.

If the difference in dry matter content between the head box end and the sludge discharge end increases, the dry matter difference increases likewise (higher numerical value). Regulating on the basis of dry matter difference accordingly aims at keeping the dry matter difference as high as possible. Accordingly, the condition involving the highest dry matter difference corresponds to the state of optimal flocculation because water in that condition will drain fastest through the screen. Thus, it is desirable to operate the system to attain the maximum difference between the solid content at the head box end and the discharge end.

A further feature involves monitoring the water line. "Water line" denotes the turning point in the curve configuration of the dry matter content for which purpose the dry matter content curve of the sludge along the screen in the direction of belt travel is determined and is also referred to as "dewatering line". In recognizing the state of dryness as an optical reflection along a dewatering line (in the direction of travel of the screen), it becomes apparent that under optimal dewatering conditions, the various dewatering phases occur very shortly downstream of the head box. If the dewatering process is not optimized, these phases occur at the end of the dewatering zone. Thus, if the optical signal is processed in such form that a shifting of the phases in the direction of the head box (improved in the sense of more rapid dewatering) attains a higher numerical value for the "water line" it becomes possible for this parameter likewise to be employed for regulating the flocculent amount or the screen velocity. The condition at which the water line is shifted most substantially in the direction of the head box corresponds to the state of optimal flocculation.

A pre-condition for the functioning of the "water line regulation" is an adequate number of photodetectors or sensors along the dewatering line so that shifts can be recognized with the appropriate sensitivity. Closely spacing a large number of the photodetectors allows the extent of liquid separation at a number of points along the separation zone and the plotting of graphs in FIGS. 2a and 2b.

Starting from monitoring the dry matter difference and the water line, the addition of flocculent and/or the speed of the screening belt is adjusted to obtain the optimal value, i.e., with the highest possible numerical value for the signal monitored. Conventional regulating methods depend on a comparison between desired and real values. If, for example, the real value is lower than the desired value a correction value is issued which results in raising the existing value and thus in a reduced deviation of the real value from the desired value.

Dewatering efficiency deteriorates at high levels as well as low levels of flocculent. Thus, a controller will not know initially whether an increase or a reduction of the amount of flocculent will lead to an improvement. A conventional controller will accordingly sometimes operate at an operating point which is far removed from the optimum. However, since the optimum depends directly on the input parameters, even the desired value can only be set with difficulty and in the event of greatly fluctuating input conditions can virtually never be found. Accordingly, the system of the invention operates according to the principle of an "optimizing iterator" and functions as follows:

First, an attempt is made to reduce the amount of flocculent because this might result in attaining cost savings. If this results in an improvement (higher dry matter difference or higher water line), the system in the next step attempts a change in the same direction (i.e., further reduction of amount of flocculent). However, if this change has a negative effect, the system reverses the direction and attempts to achieve adjustments in the opposite direction. This change takes place continuously so that the system eventually finds an optimum amount of flocculent. Deviation from this optimum amount of flocculent will result in a decrease in efficiency of the liquid separation.

In order to find the optimum value as rapidly as possible, the length of the steps of change in the case of repeated improvements is increased to achieve greater changes in a shorter time. When levelling out (direction reversal) towards the optimum, smaller step lengths are reverted to avoid unnecessary operational fluctuations due to the required changes in flocculent.

In this context, the amount of light captured by two inter-associated photodetectors forming a photodetector assembly or sensor unit and aimed at different angles onto a common region of the surface of the solid-liquid mixture, i.e., light reflected in that region from the substrate surface, derived from a light source associated with the sensor unit, serve as the parameters to be evaluated. The two photodetectors of each sensor unit are preferably set at an acute angle of about 30° to one another. The first photodetector is arranged to capture and detect the light reflected in the direction opposite to the direction of irradiation from the light source. A second photodetector is positioned to detect light reflecting from the surface at a different angle from the primary angle of reflectance. If the substrate surface is smooth and planar (the substrate has essentially a smooth liquid surface, i.e., low dry matter content), the first photodetector will capture a large amount of reflected light and the second photodetector will detect little or no light. The more uneven or rough the substrate surface (substrate essentially has no liquid surface any longer, i.e., high dry matter content), the less light will be reflected and detected by the first photodetector and the more light will be detected by the second photodetector. A rough surface diffracts a large percentage of the light so that the second photodetector detects more light than when light is directed on a smooth surface. Accordingly, this arrangement represents an excellent means for monitoring a dewatering process.

An arrangement in which the substrate is irradiated at right angles is somewhat less dependent on the distance of the actual substrate surface from the sensors which can vary within certain tolerances, than an arrangement with inclined irradiation. On the other hand, the arrangement using inclined irradiation offers the advantage that the photodetectors are not affected by heat generation arising from the light source.

Referring to FIG. 1, a schematic diagram of the process for dewatering sludge is shown. Sludge to be dewatered is introduced by way of a sludge feed line 5 to a head box 4 of a screening table 1 or optionally the screening zone of a screening belt press. The sludge is passed by way of a sludge pump 6, a sludge measuring means 7, a quantity regulating valve 8 and a mixer 10 for admixing the flocculent from the feed line 9 to the head box 4. The sludge runs from the head box 4 onto the screen 2 of the screening table 1. One roller of the screen 2 is driven by a motor 3. The filtrate passes through the screen 2 and is discharged through the filtrate drainage means 18. The dewatered sludge 19 is withdrawn at the discharge end of the screen 2 and is dumped or further treated. A plurality of sensors 15, each comprising a pair of photodetectors and an associated light source, perform measurements to determine the dry matter content of the sludge at different positions on the filter screen 2. The sensors 15 produce an output signal which is transmitted to a control unit 16. The control unit 16 in addition receives an output signal from the sludge amount measuring means 7 which can receive a level signal from an upstream vessel (not shown) through a feed control 13 to regulate the feed rate of the sludge. Based on the dry matter content signals of the sensors 15, the control unit 16 feeds a calculated value to a flow controller 14 for the flocculent supply which is adjusted by the flocculent amount measuring means 11 and a flow control valve 12. The control unit 16 can also issue a signal to a speed controller 17 to regulate the speed of the drive motor 3 of the screen table 1. Control unit 16 is a standard microprocessor as generally known in the industry suitable programmed to carry out the above-noted functions.

Figure 2B:
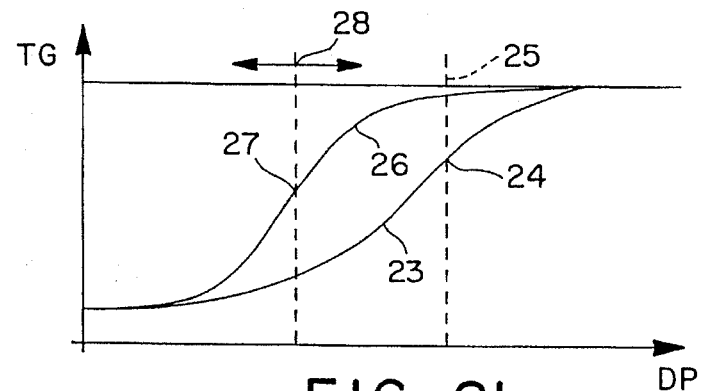
FIG. 2b is another graph showing the dry matter content (TG) of the solid-liquid mixture in relation to the position on the dewatering pathway (DP) of the separation device.
Figure 2A:
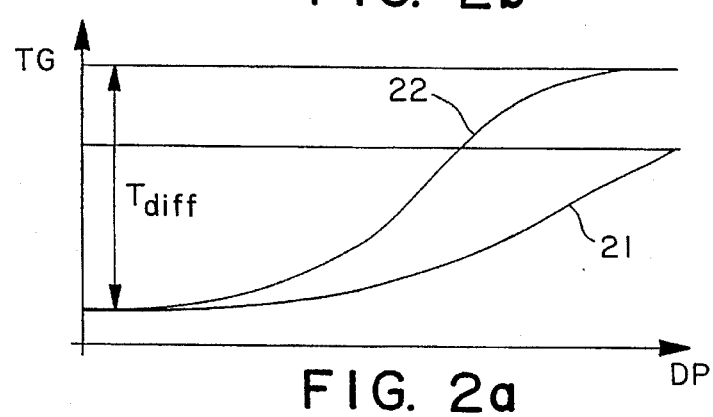
FIG. 2a is a graph showing the dry matter content (TG) of the solid-liquid mixture in relation to the position on the dewatering pathway (DP) of the separation device.
Figure 2:
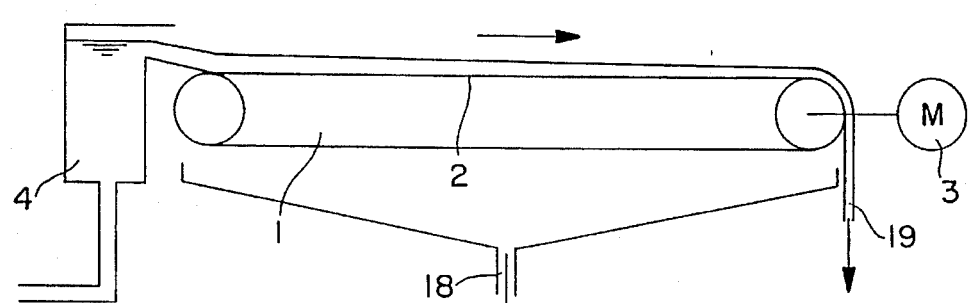
FIG. 2 is a side view of the liquid separation device in one embodiment of the invention.

FIG. 2 shows a portion taken from FIG. 1 including the screening table 1, the head box 4, the filtrate discharge 18 and the discharge means for the dewatering material (filter cake) 19.

FIG. 2a shows the pattern of the dry matter content TG (y-axis) along the dewatering pathway DP (x-axis), i.e., along the screening table 1. The extend of dewatering or solids content of the mixture at any one point along the liquid separation zone is determined using a plurality of the photodetector assemblies spaced along the pathway of the mixture being filtered. A pattern in accordance with line 21 is illustrative of an over- or under-flocculation and shows inadequate dewatering whereas a pattern in accordance with curve 22 characterizes an optimum. Here the dry matter difference $T_{dif}$, which is measured between the beginning and the end of the screening table, is a maximum.

In one embodiment, the dewatering process is controlled by adjusting the water line. FIG. 2b again denotes a plot of the dry matter content TG and the dewatering pathway DP. For a curve in accordance with line 23, the turning point 24 of the curve is in a position 25 in the dewatering pathway close to the end of the screening table 1. In some cases the turning point will not appear at all. The pattern 23 denotes an over- or under-flocculation and inefficient dewatering since the rate of dewatering occurs slowly and too far downstream in the liquid separation zone. If drying proceeds in accordance with line 26, wherein the turning point 27 of the curve is in a position 28 on the dewatering pathway which is relatively close to the head box, an optimum for the position of the so-called "water line" is present. If the position of the turning point 24, 27 is allotted a higher numerical value the closer it is to the head box 4. This value can likewise be employed for regulating the flocculent amount.

Referring to FIGS. 2a and 2b, the graphs essentially denote the extent of dewatering in relation to the position of sludge as it passes through a path in a liquid separation zone of the dewatering device. The optimum dewatering performance and efficiency occurs by a high rate of liquid separation as far upstream as possible as shown by lines 22 and 26 of FIGS. 2a and 2b, respectively. The optimum speed of the dewatering device and the amount of flocculent produces curve 26 (FIG. 2b) demonstrating a rapid increase of solids content at the upstream end of the dewatering device. Line 28 of the graph in FIG. 2b identifies the point in the path through the dewatering zone where the rate of change in solids content of the filter cake begins to decrease. This point is considered the turning point. The process and apparatus adjust the process parameters so that the optimum value is positioned as far upstream in the dewatering zone as possible.

The graphs of FIGS. 2a and 2b show that insufficient or excess amounts of flocculent in the sludge result in slower rates of dewatering as demonstrated by lines 21 and 23. Referring to FIG. 2b, the point 24 of line 23 is where the rate of dewatering and increase in solids of the filter cake begin to decrease. This point is at a downstream end of the dewatering zone and can result in inadequate dewatering by the time the filter cake reaches the discharge end of the liquid separation device.

Figure 3:
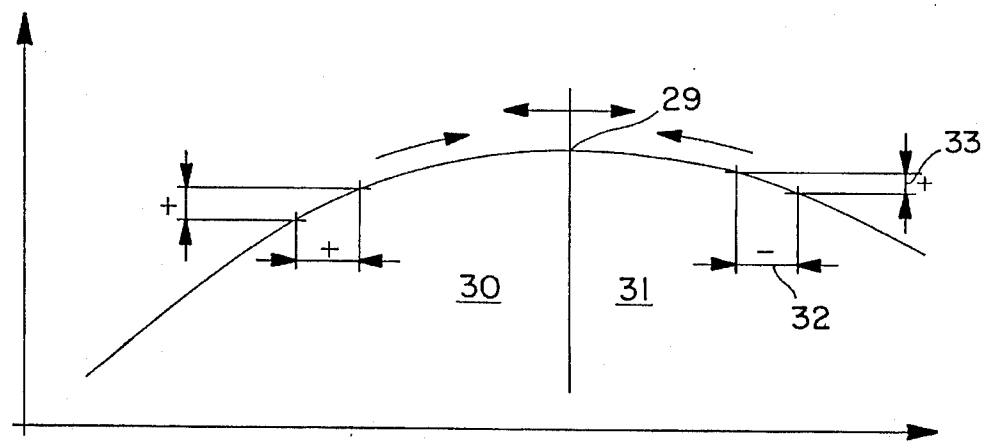
FIG. 3 is a graph showing the relationship of the extent of liquid separation (TG) to the amount of flocculent added to the solid-liquid mixture.

The optimizing procedure is illustrated in FIG. 3. For the parameter to be optimized (y-axis), it is possible to employ the dry matter difference or the water line (x-axis). This quantity, depending on the amount of flocculent (in each case for a given screen velocity), comprises an optimum 29 in the form of a maximum value. A deviation from optimum may on the one hand denote an under flocculation 30 (left-hand side) or an over-flocculation 31 (right-hand side). The procedure now takes the following course. Initially, an attempt is made to reduce the amount of flocculent. If the change in conditions correspond to the region of over-flocculation 31 (right-hand side), the reduction 32 will cause improvement of the target result 33, e.g., the dry matter difference. The next step accordingly is performed in the same direction. If initial conditions correspond to the region of under flocculation 30, a reduction of the flocculent will result in a deterioration of the target result. In that case, a direction reversal takes place so that in the next step the amount of flocculent is increased. If this time the optimum 29 is exceeded, the target value will again deteriorate and the next change proceeds in the opposite direction. Since it is to be expected that the optimum will be between the last two values, the step length of change is decreased so that eventually the optimum can be attained with optional accuracy. In practice, when the target value changes within predetermined limits, no further optimization will be conducted or attempts be made to optimize further parameters such as, e.g., the screen velocity. However, since the position of the optimum as a function of the input conditions may change rapidly, one will nevertheless, after an appropriate predetermined waiting period, attempt once again to attain a possible new optimum by changing the amount of flocculent or the screen velocity.

Figure 4A:
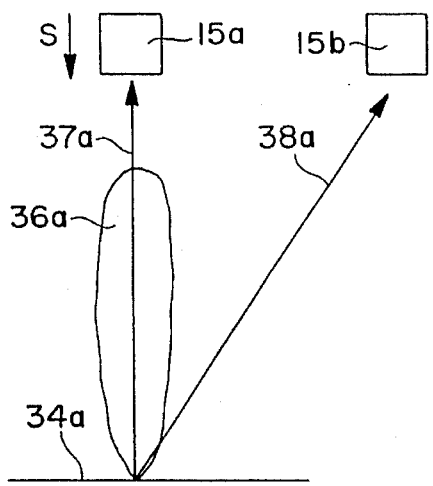
FIG. 4a is a side view of the arrangement of the light source and photodetectors in a first embodiment of the invention detecting reflection from a smooth, wet surface.

FIG. 4a shows the distribution area 36a of reflected light from an illumination field on the upper surface of the sludge for an arrangement where the irradiation of the substrate surface is directed at right angles (irradiation direction S) to the surface. The light S is directed downward to form an illumination or light distribution field 36a. If the substrate surface 34a of the sludge is smooth, the first photodetector 15a of the pair of photodetectors in assembly 15 receives substantially more light along line 37a than along line 38a of the associated second photodetector 15b arranged at an angle thereto. The quotient or ratio of the amount of light detected at 15a along line 37a to the amount of light detected at 15b along line 38a is high in this instance. Photodetectors 15a, 15b are connected to the control unit 16 which receives the signals from the photodetectors. Control unit 16 calculates the quotient or ratio of the signals as a value indicating the solid content and extent of liquid separation of the mixture.

Figure 4B:
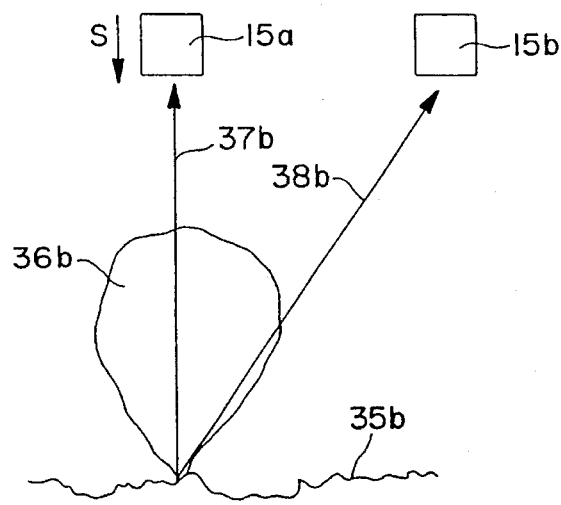
FIG. 4b is a side view of the detector arrangement of the embodiment of FIG. 4a detecting reflection from a rough, dry surface.

Referring to FIG. 4b, where the substrate surface 35b is uneven, the proportion of the light captured by the associated second photodetector 15b along line 38b as compared with the proportion of light received by the first photodetector 15a increases while the quotient or ratio decreases. As shown in FIG. 4b, a rough, dry surface 35b produces an illumination field 36b wider than field 36a in FIG. 4a due to the scattering of the reflected light. As a result, the quotient or ratio can be processed as a correction variable which is representative of the pattern of dewatering such that the higher the ratio or quotient, the smaller amount of dewatering has taken place. A decrease in the ratio of light reflected along line 37b to the light reflected along line 38b indicates an increase in solids content of the material.

Figure 4C:
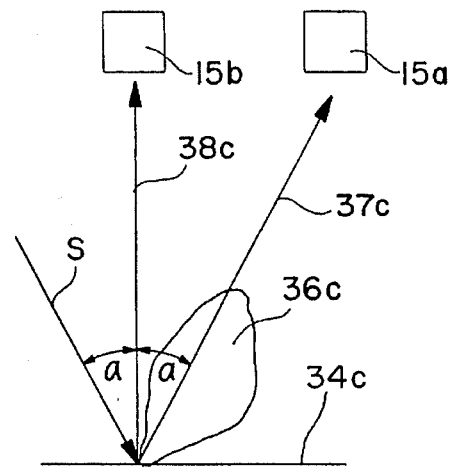
FIG. 4c is a side view of the arrangement of the light source and photodetectors in an alternative embodiment of the invention detecting reflected light from a wet, smooth surface.

FIG. 4c illustrates the reflected light distribution field 36c for an irradiation (S) of the substrate surface 34c at an inclined angle α. In this embodiment, the angle α of major reflectance 37c from the surface of the sludge is equal to and opposite to the axis of the light beam S. The first photodetector 15a is positioned to detect the major reflectance beam along line 37c. The second photodetector 15b is positioned to detect light reflecting from the surface along an angle of reflectance different from line 37c. In the embodiment shown, the second photodetector 15b is positioned to detect light reflecting along line 38c essentially perpendicular to the surface 34c. As shown in FIG. 4c, the smooth and wet surface 34c produces a small reflectance distribution 36c with most of the reflected light being directed along line 37c toward photodetector 15a. Only small amounts of light are reflected along line 38c when a smooth surface 34c is illuminated.

Figure 4D:
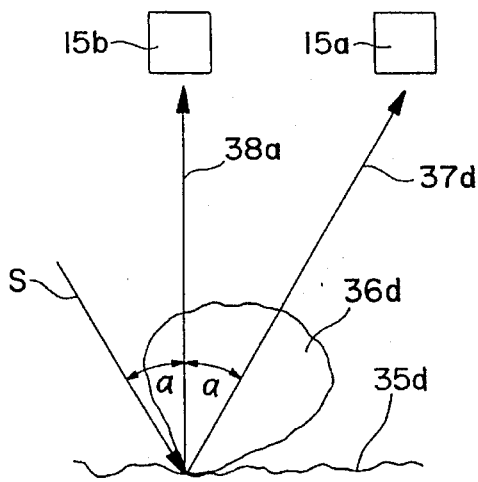
FIG. 4d is a side view of the detector arrangement of the embodiment of FIG. 4c detecting reflected light from a rough, dry surface.

As shown in FIG. 4d, a rough and dry surface 35d results in broad reflectance distribution 36d where less reflected light is directed toward photodetector 15a along line 37d in comparison to the amount of light reflected along line 37c. More reflected light is directed along line 38d toward photodetector 15b due to the scattered reflectance distribution 36d.

Figure 5A:
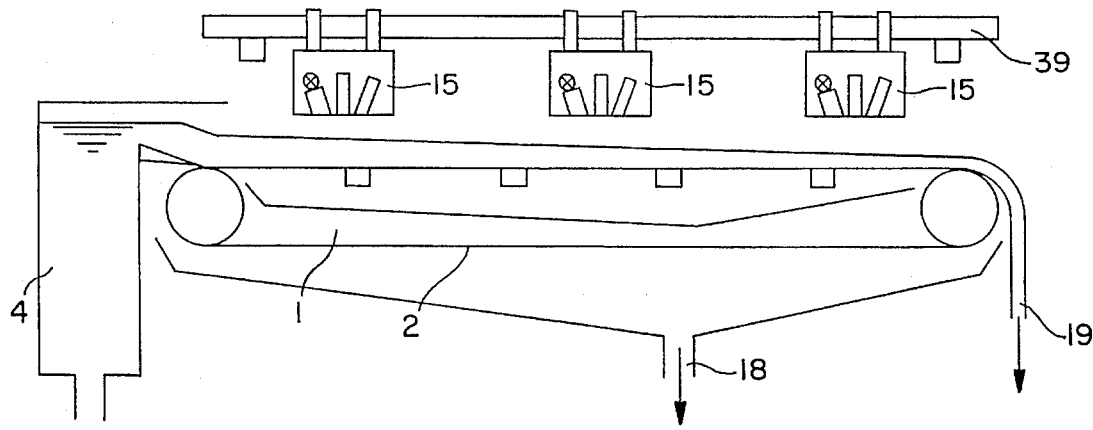
FIG. 5a is a side view of the liquid separation device of one embodiment showing the arrangement of the light source and photodetectors.
Figure 5B:
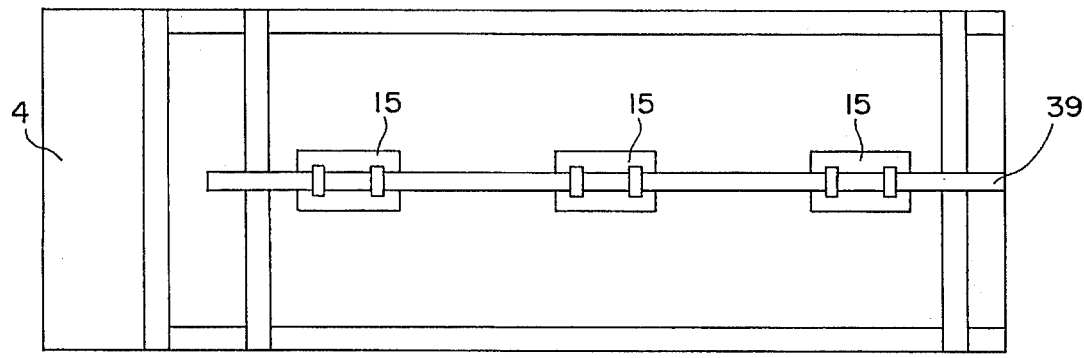

FIGS. 5a and 5b represent a possible arrangement of the photodetector assemblies or photosensors 15 over a screening table 1. FIG. 5a shows the screening table 1 with the head box 4, the screen 2, the filtrate discharge 18 as well as the filter cake 19. Above the screening table 1, three sensor units 15 are mounted to a bracket 39. This represents a minimum of sensor units 15 in order to also be able to regulate the water line. In further embodiments, more than three photosensor units 15 are suspended above the dewatering device. In preferred embodiments, at least one of the photodetector assemblies 15 is positioned near an upstream feed end of the dewatering device and one of the photodetector assemblies 15 is positioned near the downstream discharge end.

Figure 6:
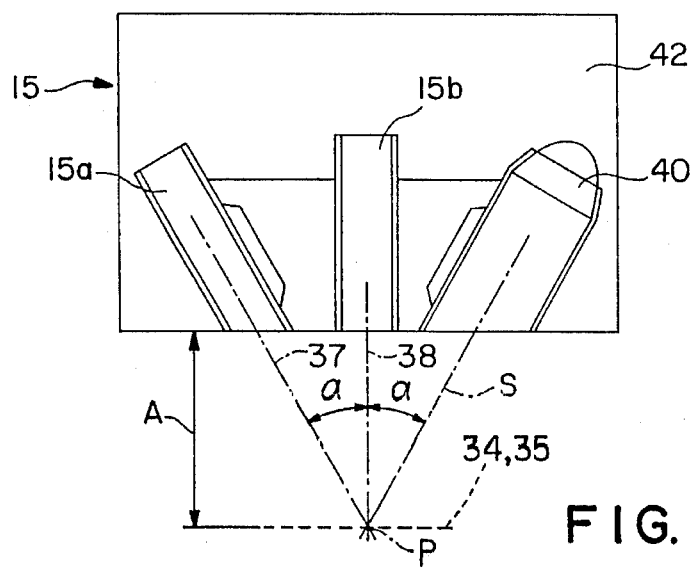
FIG. 6 is a cross-sectional view of the detector assembly showing the light source and photodetectors.

FIG. 6 shows the details of the photodetector assembly or sensor unit 15. The entire unit 15 is accommodated in a closed housing 42 in order to be protected against the prevailing moist environment of the plant. A lamp 40 which can be a halogen lamp or infrared lamp, as well as the two photodetectors 15a, 15b, are supported within housing 42. Photodetectors 15a, 15b may be standard photodetectors to detect the measure of the amount of light from the light source. In order to measure the light reflected in the direction of main reflection from the light source and that reflected at an angle thereto, the axes of the lamp and of the photodetectors are inclined in relation to one another. In the embodiment illustrated, the light from lamp 40 is irradiated onto the surface 34, 35 of the material to be dewatered at an angle α which preferably is about 30° to the vertical direction from surface 34, 35. The axes of the light source 40 and photodetectors 15a, 15b, at a predetermined distance A from the surface 34, 35 of the material, will meet in one point P. Typically, distance A is about 100 mm. In this manner, the light spot will always be sufficiently large and the measurement of the reflected light will always be in the illumination and distribution area 36 even when minor deviations in the surface level occur. The light reflected in the main reflection direction 37 is here likewise detected by a photodetector 15a inclined at an angle α to the vertical direction opposite lamp 40 whereas the vertically arranged associated second photodetector 15b will measure the light reflected at the angle α to the axis of lamp 40. Alternatively, it is also possible for the lamp 40 to irradiate the surface at right-angles and the associated second photodetector 15b measuring the light reflected at an angle to the surface by the angle α, while the first photodetector 15a is aimed at right-angles to the surface of the material as shown in FIGS. 4a, 4b. The arrangement illustrated in FIG. 6 ensures a simple overlap of the irradiation and measuring surface and permits a simple construction of the sensor unit 15. Simple phototransistors are also employed for photoelectric barriers can be employed as photodetectors.

The invention is not limited to the described examples but may also be applied advantageously to other solids-liquid separating processes such as, e.g., drying. In this case, for example, the energy input into the system, e.g., the division of the energy input into different forms of energy (e.g., steam, blowers, heating), may be employed as target values with a need for appropriate control or regulating. If drying is too slow, this will likewise result in problems, e.g., when picking up the paper from the drying cylinder. Since the drying of paper proceeds on the one hand by contact with the usually steam-heated cylinders, on the other hand by blowing hot air usually generated by means of gas burners, it is possible to optimize the ratio of contact drying (on the cylinder) and convection drying (by the blowing of hot air) to minimize production costs. The energy costs for producing steam, gas and electricity (circulatory fans) must be taken into account in maintaining quality to the material and may change at short notice to affect the product quality. An optimum may be attained in a simple manner by stepwise changes of a parameter and testing of the target value such as, e.g., energy costs.

What is claimed is:

1. An apparatus for separating liquid from a solid-liquid mixture comprising:

a liquid separation device having a means for continuously moving a solid-liquid mixture through a liquid separating zone of said liquid separating device, said separation zone having an upstream end and a downstream end;

at least two photodetector assemblies positioned above said separating zone;

each of said photodetector assemblies having a light source for projecting light onto an illumination area of an upper surface of the solid-liquid mixture at a first angle with respect to said upper surface, and a first photodetector for detecting said light reflected from said illumination area on said upper surface at a second angle with respect to said upper surface, said first photodetector having means for producing a first output signal in response to detected reflected light;

at least one of said photodetector assemblies having a second photodetector for detecting light reflected from said illumination area on said upper surface at a third angle with respect to said upper surface, said second photodetector having means for producing a second output signal in response to detected reflected light;

control means connected to said photodetector assemblies for receiving said output signals and for controlling the liquid separation of said mixture.

2. The apparatus of claim 1, wherein said first photodetector detects light reflecting at an acute angle with respect to the light projected onto said illumination area on said upper surface of said mixture.

3. The apparatus of claim 1, wherein said second photodetector is positioned to detect light reflected from said upper surface of said mixture at an angle of about 30° to said light source.

4. The apparatus of claim 1, wherein said first photodetector is positioned to detect light reflected from said upper surface of said mixture at an angle substantially equal to and opposite said first angle.

5. The apparatus of claim 1, wherein said first and second photodetectors are contained in a sensor unit.

6. The apparatus of claim 5, wherein said light source is contained in said sensor unit.

7. The apparatus of claim 1, comprising a plurality of said photodetector assemblies spaced apart in said separation zone along an axis in a direction of travel of said mixture.

8. The apparatus of claim 1, further comprising a feed device for feeding said solid-liquid mixture to said liquid separating device;

a delivery device for delivering a flocculent to said solid-liquid mixture upstream of said separation zone; and mixing means for mixing said flocculent with said solid-liquid mixture upstream of said liquid separating device.

9. The apparatus of claim 8, wherein said control means is connected to said delivery device for controlling the amount of flocculent delivered to said mixture.

10. The apparatus of claim 1, wherein said liquid separating device is a drying device.

11. The apparatus of claim 1, wherein said liquid separating device is a belt screen press.

12. The apparatus of claim 1, wherein said liquid separating further comprises drive means for driving said separation device; and speed regulating means for regulating the speed of said drive means, said control means connected to said speed regulating means for controlling the speed of said drive means in response to said output signal.

13. The apparatus of claim 1, said photodetector assemblies further comprising means for determining a solid content value of said mixture below said assemblies.

14. The apparatus of claim 13, said control means including means for calculating the difference between the solid content value of each assembly and calculating a rate of liquid separation, and producing a control signal in response to said calculated rate.

15. The apparatus of claim 14, wherein said control signal adjusts said liquid separation device to obtain a maximum differential between the solid content of the mixture at said upstream end and the solid content of the mixture at said downstream end.

16. The apparatus of claim 1, comprising means for using said output signals to perform a plurality of step adjustments of the separation device to obtain a predetermined rate of separation.

\* \* \* \* \*